United States Patent [19]

Pierret et al.

[11] Patent Number: 5,233,285
[45] Date of Patent: Aug. 3, 1993

[54] VOLTAGE REGULATOR DEVICE FOR CHARGING A BATTERY BY AN ALTERNATOR

[75] Inventors: Jean M. Pierret, Paris; Didier Canitrot, La Queue en Brie, both of France; Alessio Pennisi, Milan; Fabio Marchio, Gallarate, both of Italy

[73] Assignee: Valeo Equipemento Electriques Moteur, Creteil, France

[21] Appl. No.: 797,694

[22] Filed: Nov. 25, 1991

[30] Foreign Application Priority Data

Nov. 27, 1990 [FR] France .................... 90 14789

[51] Int. Cl.⁵ .................................. H02J 7/14
[52] U.S. Cl. ............................ 320/28; 322/73; 320/64
[58] Field of Search .............. 322/25, 28, 58, 59, 322/60, 72, 73, 99, 100; 320/61, 64, 68

[56] References Cited

U.S. PATENT DOCUMENTS

| | | | |
|---|---|---|---|
| 3,673,489 | 6/1972 | Riff | 322/28 |
| 3,697,859 | 10/1972 | Nordbrock | 322/28 |
| 4,223,363 | 9/1980 | Santis et al. | 322/28 X |
| 4,335,344 | 6/1982 | Gant | 322/28 X |
| 4,342,955 | 8/1982 | Gant | 322/90 X |
| 4,362,983 | 12/1982 | Mori et al. | 322/28 |
| 4,386,310 | 5/1983 | Sievers | 322/28 |
| 4,409,539 | 10/1983 | Nordbrock et al. | 322/28 |
| 4,451,774 | 5/1984 | Akita et al. | 322/99 X |
| 4,567,422 | 1/1986 | Sims | 322/73 X |
| 4,839,576 | 6/1989 | Kaneyuki et al. | 322/28 |
| 5,013,996 | 5/1991 | Conzelmann et al. | 322/28 |

FOREIGN PATENT DOCUMENTS

| | | |
|---|---|---|
| 0116482 | 8/1984 | European Pat. Off. |
| 0330561 | 8/1989 | European Pat. Off. |
| 2285743 | 9/1974 | France. |

*Primary Examiner*—Steven L. Stephan
*Assistant Examiner*—Kristine Peckman

[57] ABSTRACT

A regulator device for charging a battery from an alternator that delivers a rectified voltage including a ripple component. The device is of the type including a regulator circuit acting on the mean value of the rectified alternator voltage and includes a circuit for obtaining the main value, a threshold comparator, a time delay circuit, and a power stage for controlling the current flowing through the excitation winding of the alternator. According to the invention, the device includes a negative feedback circuit between a point downstream from the time delay circuit, and the input to the circuit for obtaining the mean value. The device also shifts the mean value downwards during periods when the excitation current is decreasing. The device is particularly applicable to increasing the frequency of regulation under a heavy load.

10 Claims, 4 Drawing Sheets

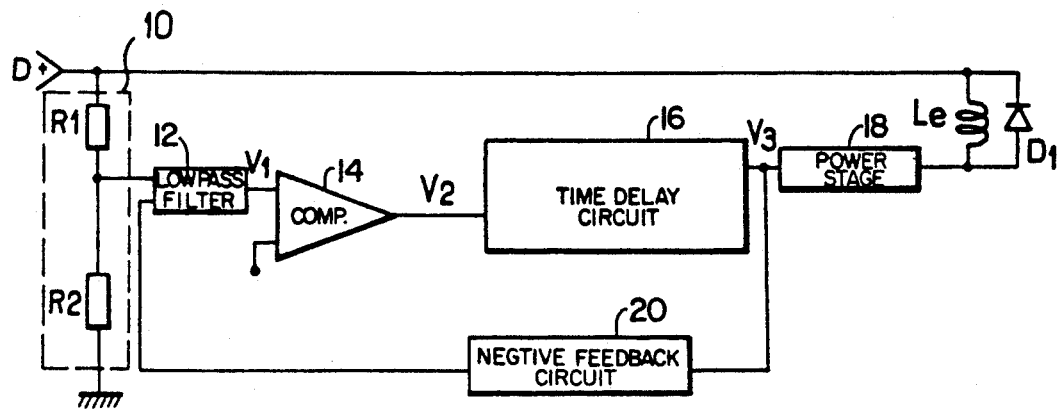
FIG_1
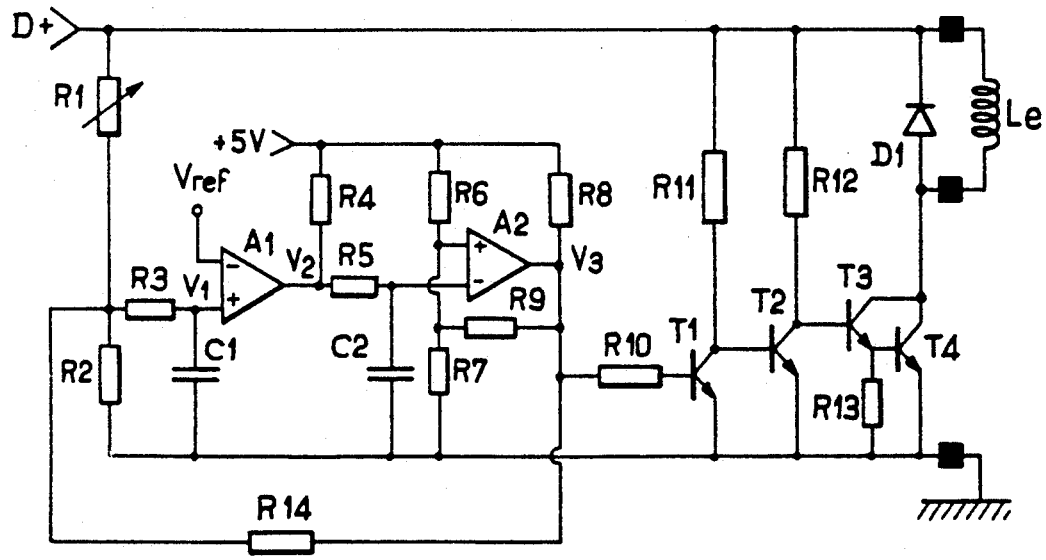
FIG_2

VOLTAGE REGULATOR DEVICE FOR CHARGING A BATTERY BY AN ALTERNATOR

The present invention relates in general to a regulator device for charging a battery by and from an alternator delivering a rectified voltage that includes a ripple component.

BACKGROUND OF THE INVENTION

In this art, U.S. Pat. No. 5,079,496 discloses a regulator device which comprises a regulator circuit acting on the mean value of the rectified alternator voltage and including in succession a circuit for obtaining the mean value, a threshold comparator, a timing circuit, and a power stage for controlling the current flowing through the excitation winding of the alternator.

In such a prior circuit, the circuit for obtaining the mean value is constituted by envelope detector based on the positive peaks of the voltage to be regulated, and associated with an RC filter having the free end of its capacitor connected to the output of said detector. The purpose of such a circuit is to obtain the mean value of the voltage to be regulated while introducing hardly any phase shift or delay, so as to avoid encouraging an excessive drop in the frequency at which regulation is performed. It is recalled that such a drop in frequency is harmful, in particular since it makes the driver aware of variations in the intensity of the light beams produced by the vehicle headlights.

That prior circuit is easy to implement using discrete electronic components, but presents difficulties when it is to be implemented in monolithic technology. More particularly, that circuit requires capacitance in the envelope detector that is expensive in silicon area. This gives rise to a product of increased cost and size.

The present invention seeks to mitigate this drawback of the prior art and to propose a device that can easily be integrated on a silicon chip.

An auxiliary object of the invention is to propose a regulator device which increases the frequency at which regulation takes place reliably and significantly under limiting operating conditions.

SUMMARY OF THE INVENTION

The present invention thus provides a regulator device for charging a battery from an alternator that delivers a rectified voltage including a ripple component, the device being of the type including a regulator circuit acting on the mean value of the rectified alternator voltage and comprising, in succession, a circuit for obtaining the main value, a threshold comparator, a time delay circuit, and a power stage for controlling the current flowing through the excitation winding of the alternator, the device including a negative feedback circuit between a point downstream from the time delay circuit and the input to the circuit for obtaining the mean value, and suitable for shifting said mean value downwards during periods when the excitation current is decreasing.

In this way, for example when operating under conditions close to full load, i.e. when the voltage being regulated increases only very slowly when excitation current is applied, as soon as the power stage is switched to open circuit once the mean value of said regulated voltage has caused the time delay circuit to switch over, the said mean value is shifted downwards at the input to the filter so as to cause the time delay circuit to switch back again very quickly. The pulses for switching off the excitation current are thus significantly shortened, and as a result the regulation frequency is increased.

Preferably, the circuit for obtaining the mean value is constituted by a low pass filter.

In an advantageous embodiment, when the time delay circuit delivers a rising voltage edge to reduce the excitation current, the negative feedback circuit is a resistive circuit.

BRIEF DESCRIPTION OF THE DRAWINGS

A preferred embodiment of the invention is described by way of example with reference to the accompanying drawings, in which:

FIG. 1 is a block diagram of a device of the present invention;

FIG. 2 is a detailed circuit diagram of the device shown in FIG. 1;

DETAILED DESCRIPTION

Figure 3:
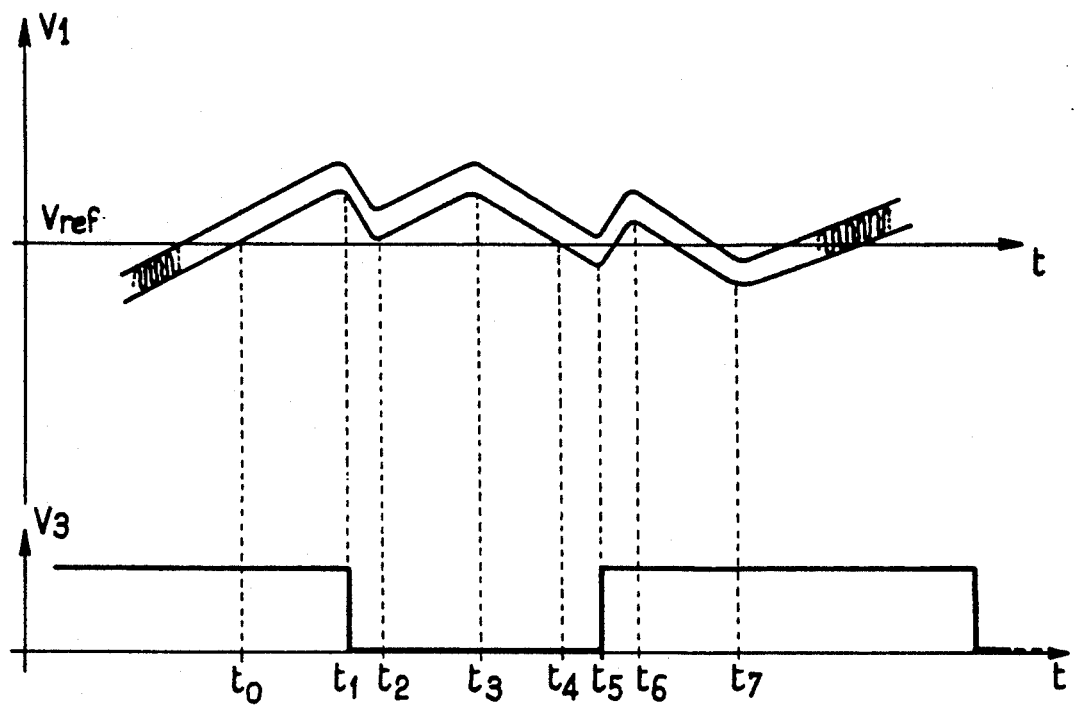
FIG. 3 is a timing chart showing a first mode of operation of the FIG. 2 circuit.

With reference initially to FIG. 1, a regulator device of the invention comprises an input terminal for a rectified alternator voltage to be regulated. In the present case, this voltage is the voltage D+ taken from the group of three rectifier diodes conventionally provided downstream from a three-phase alternator. However, it is clear that the invention is equally applicable to performing regulation on the basis of the battery voltage B+.

A voltage divider bridge comprising two resistors R1 and R2 in series is connected between the input terminal and ground. For the purpose of calibrating the device, R1 may be an adjustable resistor.

The midpoint of the divider bridge is applied to the input of a lowpass filter 12 for the purpose of attenuating the ripple component in the voltage applied to its input and obtained by dividing the voltage D+, without however giving rise to excessive delay or phase shift in the variation of the mean value of the signal, as described in detail below.

The output from the filter 12 is applied to a first input of a comparator 14 whose other input receives a reference voltage Vref.

The output of the comparator 14 is applied to the input of a time delay circuit 16 for preventing the circuit latching onto the frequency of the ripple component in the input signal. As explained below, the time delay starts in this case at the instant when the negative peaks in the signal cross the threshold defined by Vref.

The output from the time delay circuit 16 is applied to the input of a power stage 18 of conventional design whose output is connected to a first terminal of the excitation winding Le of the alternator, which terminal may be associated in conventional manner with a freewheel diode D1. The other terminal of the winding Le receives the voltage D+.

According to an essential aspect of the present invention, the output of the time delay circuit 16 is also applied via a negative feedback circuit 20 to the input of the filter 12.

Ignoring the negative feedback circuit 20, for the moment, such a regulator operates as follows: the fraction V0 of the voltage D+ applied to the input of the filter 12 is stripped by the filter of the major part of its ripple component. The voltage V1 at the output of the filter thus comprises a superposition of the mean value of the input voltage of the filter that varies in the same way as the mean value of D+, together with a small residual ripple component.

When V1 crosses the voltage threshold Vref in the upwards direction, then the comparator 14 delivers a high voltage level which is applied to the time delay circuit 16. This circuit is designed so that after a determined time lapse, typically 2 ms, its output switches from a high voltage level to a low voltage level. This falling edge as applied to the input of the power stage 18 has the effect of disconnecting the winding Le from ground. Consequently the excitation current in Le decreases and this has the effect of lowering the mean value of D+ after a predetermined time delay equal to the sum of the time delays generated in the alternator itself and in the filter 12.

V1 then crosses the threshold Vref in the downwards direction, which has the effect of returning the voltage at the input of the time delay circuit 16 to zero and subsequently of causing the output thereof to return to the high level, thereby re-establishing the current feed to Le, thus enabling the excitation current to start increasing again.

This type of regulation gives entire satisfaction when the alternator is under moderate load: regulation is observed to take place between narrow limits at a frequency which may be several tens of hertz, for example, and the voltage D. is thus maintained at a value very close to the charging voltage of the battery, e.g. 14.5 volts.

For further details, reference may be made to U.S. Pat. No. 5,079,496, the contents of which is incorporated into the present description by reference.

In addition, it is well known in a regulator of the type described (but still ignoring the negative feedback 20) that when operating under conditions of heavy load, the regulation frequency may decrease considerably, so much so that the vehicle driver may become aware of the variations in the voltage D+, particularly in the brightness of the illumination provided by the vehicle headlights.

The purpose of the negative feedback circuit provided in accordance with the present invention is to increase the regulation frequency significantly when under high load, thereby avoiding this drawback. More precisely, and as explained in detail below, the negative feedback circuit 20 in association with the other components has the purpose of applying offsets to the voltage V0 at the input to the filter 12 that have the effect of significantly reducing the duration of periods during which the excitation current is decreasing. As a result, during each of these periods, the mean value of D+ drops by a smaller amplitude, such that the subsequent return to the threshold value Vref is quicker, and as a result the frequency of regulation is increased.

A particular implementation of a regulator circuit of the invention is now described in detail with reference to FIG. 2.

The divider bridge R1, R2 is described above. The common point between R1 and R2 is connected to a first terminal of a resistor R3. The second terminal of R3 is connected to the non-inverting input of a differential amplifier A1, which input is connected to ground via a capacitor C1. The components R3, C1 define a lowpass filter 12, and the values of these two components are chosen so as to attenuate the ripple component to a certain extent while nevertheless causing a relatively small amount of delay in the mean value of the signal so as to be compatible with the regulation to be performed.

The inverting input of A1 receives a reference voltage Vref which may be obtained, for example, from the voltage D+ by means of a suitable zener diode (not shown).

A resistor R4 is connected between the output of A1 and a stabilized voltage supply, e.g. at +5 volts. This stabilized voltage may also be derived from the voltage D+, e.g. by means of a conventional circuit combining a zener diode (not shown) and a bipolar transistor.

The output of A1 is connected to the inverting input of a second differential amplifier A2 via a resistor R5. This inverting input is connected to ground via a capacitor C2. A divider bridge constituted by resistors R6 and R7 connected in series between the +5 volt line and ground serves to apply a set voltage to the non-inverting input of A2. A resistor R8 connects the output of A2 to the +5 V line, and a feedback resistor R9 connects the output of A2 to its non-inverting input.

The output of A2 is also connected via a resistor R10 to a power stage. This stage comprises two NPN transistors T1 and T2 each having its own collector resistor, respectively R11 and R12, and followed by a Darlington stage T3, T4, R13 whose collector is connected to the excitation winding Le which is associated with the freewheel diode D1.

Finally, according to an essential aspect of the invention, the output of A2 is connected to the midpoint of the divider bridge R1, R2 via a resistor R14.

V0 designates the voltage at the input to the filter, V1 the voltage at the non-inverting input of A1, V2 the voltage at the output of A1, and V3 the voltage at the output of A2.

The stage built around A2 and the power stage are substantially identical to those described in the above-mentioned patent application. In particular, the time delay circuit makes use of the capacitor C2 in combination with A2 being connected as a two-threshold comparator. It gives rise to the time delays required by the manner in which the voltage across the terminals of C2 varies slowly.

The operation of the circuit in FIG. 2 is explained below in detail with reference to FIG. 3.

Firstly it will be understood that the negative feedback circuit constituted by the resistor R14 behaves as follows: when the output of A2 goes from 0 V to +5 V, this has the effect of superposing a DC component on the divided voltage D+ at the input of the filter, with the value of the DC component being determined by the resistances of the resistors R14, R1, and R2. Consequently, the input voltage V0 of the filter is offset upwards by said amplitude, and the output voltage V1 from the filter is subjected to the same offset with a slight delay. Conversely, when the output voltage of A2 switches from +5 V to 0 V, then the voltage V1 is offset in the opposite direction.

It may be observed that the comparator A1 and the time delay circuit that follows it operate in such a manner that the time delay begins at the moment when the negative peak voltages in the signal V1 begin to cross the threshold voltage Vref in one direction or the other.

More precisely, assume that the voltage V1 is initially continuously below Vref and that its mean value is increasing. The voltage V3 is then about +5 V, and a fraction of this voltage is applied to the input of the filter which has the effect of offsetting the mean value of V1 slightly upwards relative to the value that would obtain if account were only being taken of the voltage D+ on its own.

When the first positive peaks begin to cross Vref, then V2 comprises a succession of high and low voltage levels. It is nevertheless incapable of charging C2 sufficiently to cause the voltage across its terminals to cross the threshold at which the comparator A2 is then operating. The output from the comparator therefore remains at a high voltage level.

When the negative peak voltages in V1 in turn cross Vref, then V2 is continuously at a high voltage level, thereby causing C2 to charge at a rate determined by the resistances of R4 and R5 until the voltage across the terminals of C2 crosses the threshold then being applied by the comparator A2. V3 then switches over from the high level to the low level after a delay which is determined relative to the instant at which the negative peaks in V1 cross Vref. This delay may be about 2 ms, as described above.

The threshold value of the comparator A2 then changes. However, and above all, the voltage V0 input to the filter is offset downwards since the fraction of the +5 V that was being superposed on the fraction of D+ disappears. V1 is subjected to the same offset after a short time delay equal to the time constant of the filter. As explained below, this offset has different effects depending on the rate of increase in the mean value of V1. In addition, the power stage is controlled so as to open T3, T4, thereby reducing the excitation current of the alternator.

After a fixed time lapse due to the delay specific to the alternator and to the time constant of the filter, V1 decreases. When its negative peaks begin to cross Vref, then the voltage V2 switches from high level to low level. C2 discharges via the comparator A1 and the resistor R5, and the threshold then being applied in A2 is crossed in the downwards direction so V3 switches again to the high level. This gives rise to a new upwards offset in the voltage V0 and then in the voltage V1, with the threshold of the comparator A2 being changed and with the Darlington pair T3, T4 being closed so as to increase the excitation current again.

More precisely, and now with reference to FIG. 3, when the negative peaks in the filtered signal V1 cross the threshold Vref at an instant t0, the time delay circuit comes into action to cause the output of A2 to switch over from high level to low level at instant t1, e.g. 2 ms later. This gives rise to a downwards offset in the mean value of V1 (between t1 and t2), but the amplitude of this offset is insufficient to cause the negative peaks to go back below Vref. Consequently, the capacitor C2 remains charged and V3 remains at high level. The Darlington pair T3, T4 is open circuit, thereby causing the excitation current to decrease.

After a predetermined time lapse caused by the alternator itself and by the filter R3-C1, this decrease in excitation current causes the mean value of V1 to decrease (between t3 and t4). When the negative peaks begin to cross back over the threshold Vref in the downwards direction (instant t4), then C2 discharges via the comparator A1 and resistor R5. The threshold then being applied by A2 is crossed at instant t5. V3 then switches back from low level to high level which serves firstly to increase the excitation current again via the power circuit, secondly to increase the threshold applied by A2, and finally to offset the mean value of V0 and then of V1 back up again (increase of V1 between t5 and t6). It may be observed here that because of this increase in V1, this voltage goes back fully above Vref, however this nevertheless takes place only during a length of time that is too short to charge C2 sufficiently to cause A2 to switch over again. V3 therefore remains at the high level. Between t6 and t7, the decrease in V1 continues, still because of the delay specific to the alternator and to the filter R3-C1. At instant t7, the new increase in the excitation current Ie gives rise to a new increase in V1, and the cycle begins again.

It will be understood that the negative feedback has the effect of increasing the frequency of the regulation by advancing the moment at which the negative peak in V1 cross Vref, with the regulation frequency having an upper limit imposed by the time delays induced by the time delay circuit.

Figure 4A:
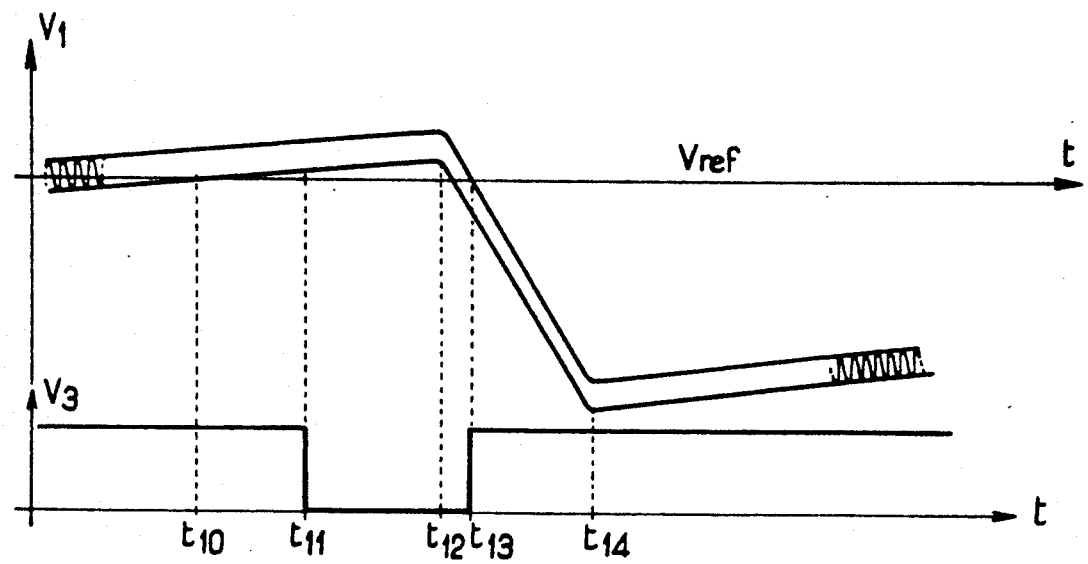
FIG. 4a is a timing chart showing how the circuit would operate in a second mode if a specific portion thereof were to be omitted.
Figure 4B:
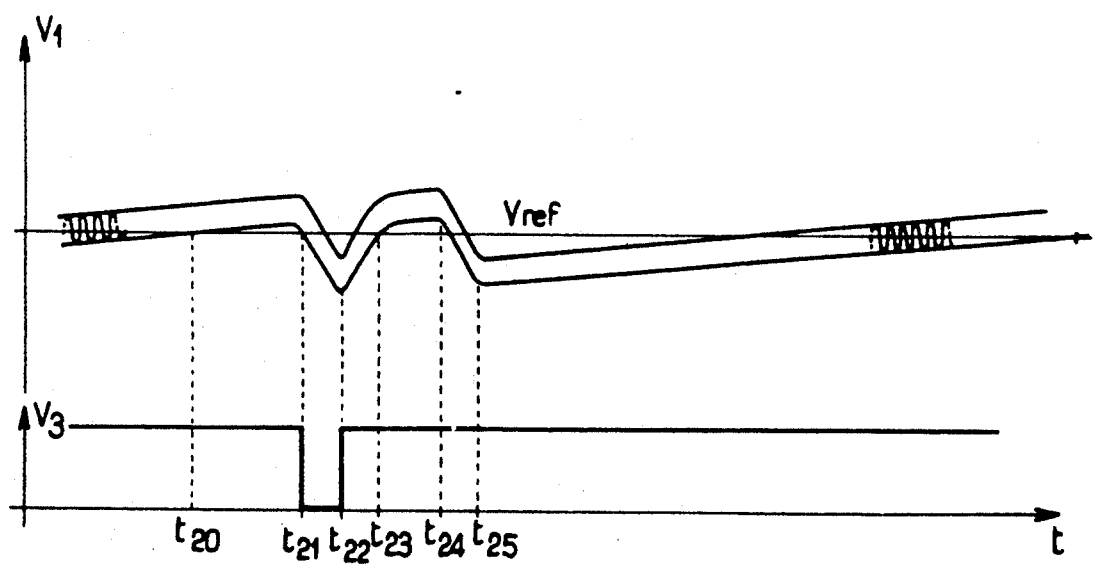
FIG. 4b shows the true operation of the full circuit in this second mode.

With reference to FIGS. 4a and 4b, the behavior of the circuit of the present invention with reference to FIGS. 4a and 4b when operating close to full field is now described, i.e. when the various components in the vehicle are drawing a large amount of electricity.

For explanatory purposes, FIG. 4a shows what happens when the negative feedback between the output of A2 and the filter is omitted. FIG. 4b shows what happens when the negative feedback is provided in accordance with the present invention.

It is recalled initially that operation close to full field is characterized by a very slow rate of rise in the mean value of D+ and thus of V1 during periods while the excitation current is increasing, and by a very rapid rate of fall in said mean value when the excitation winding ceases to be fed with current.

Regulation thus tends to take place with a high duty ratio, but over extremely long periods of time, and this is to be avoided as mentioned above.

The sequence of events that would occur if the negative feedback via R14 were omitted is initially described with reference to FIG. 4a. At t10, the negative peaks in V1 cross Vref. After the time delay, V3 switches over to the low level (instant t11). Because of the time delay specific to the alternator and the filter, the mean value of V1 begins to decrease only at t12, which is several ms after t11, for example. Shortly after t12, the negative peaks in V1 cross Vref, and at a later instant (t13) the output V3 switches over again to high level, thereby causing the mean value of V1 to begin increasing again at t14 after the time delay specific to the alternator and the filter R3-C1 has elapsed. A relatively long duration is thus obtained in the de-excitation negative pulse applied at V3 (time lapse t13-t11). This means that a large drop occurs in V1, and as a result much longer lengths of time takes place during which the negative peaks do not reach Vref again, starting from instant t14, and thus the frequency of regulation is very low.

The operation circuit of the invention under the same conditions is now described with reference to FIG. 4b.

t20 designates the instant at which the negative peak voltages cross Vref. t21 is the instant at which V3 switches to the low level. Given that V1 has risen only very little above Vref at this instant, the drop in V1 due to the negative feedback has the effect of making it cross Vref again. C2 therefore discharges and causes the comparator A2 to switch over again after a very short time lapse (t22). The de-excitation pulse (between t21 and t22) is thus seen to be much shorter than in the case of FIG. 4a. The regulation frequency is thus very significantly increased by the negative feedback of R14 in this type of situation.

Naturally the switchover of V3 at instant t22 causes the mean value of V1 to rise again (between t22 and t23), with this voltage remaining entirely above the threshold Vref between t23 and the instant t24 at which V1 drops again, this being the delayed effect of the initial switchover of V3 to the low level (at instant t21). It remains to be observed here that substantially between t23 and t24, V1 does not remain above Vref for a period of time that is long enough to cause V3 to switch again from the high level to the low level (because of the time delay that exists between the negative peaks crossing Vref and the switchover taking place).

Between instants t24 and t25, i.e. a length of time substantially equal to the length between t22 and t21, V1 drops and crosses Vref. Thereafter, V1 increases again, slowly, and a new cycle begins.

It may be observed that because the period t22–t21 is much shorter than the corresponding period t13–t11 in FIG. 4a, the drop in V1 between t24 and t25 is of much lower amplitude than it is in FIG. 4a. V1 therefore returns to the level of Vref much more quickly and the frequency at which regulation takes place is significantly increased. It may also be observed that Vref, and consequently D+, oscillate between much narrower limits than is the case in FIG. 4a. The battery charging voltage therefore follows the nominal charging voltage fixed by Vref (e.g. 14.5 volts) with very much better accuracy.

In practice, by an appropriate choice of components which is within the competence of the person skilled in the art, there is no difficulty in obtaining a regulation frequency greater than 20 Hz under conditions close to full field. At such a frequency, the visual effects of fluctuations in D+ are imperceptible to the human eye.

Figure 5:
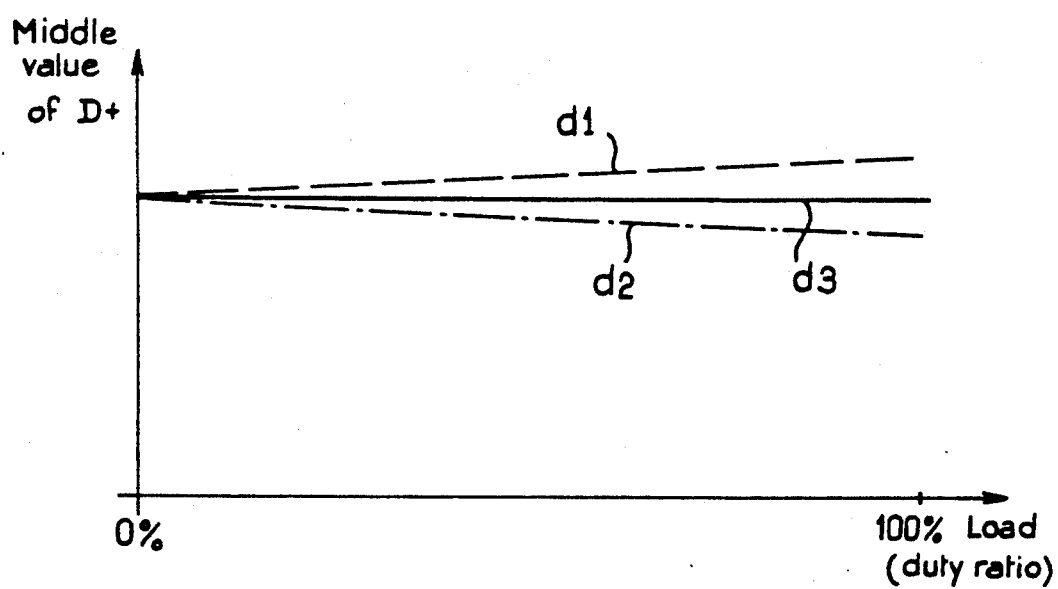
FIG. 5 is a graph showing how the mean value of the regulated voltage varies as a function of alternator load.

A particularly advantageous effect obtained with the circuit of the present invention is now described with reference to FIG. 5.

It should initially be observed that in well-known manner the amplitude of the ripple component in the voltage D+ increases with increasing load on the alternator. The amplitude of the residual ripple component in the voltage V1 increases similarly.

Given that the excitation/de-excitation periods for the alternator are determined in the preferred circuit of the invention by comparing the reference voltage Vref with the voltage values of the negative peaks in V1, there exists an offset between the value Vref and the mean value of V1, and thus between the reference value for D+ and its real mean value. This offset is proportional to the amplitude of the ripple component, and it therefore increases with load. The dashed lines in FIG. 5 thus show the way in which the mean value of the regulated voltage D+ would vary as a function of the load on the alternator. To a first approximation, this is a straight line d1 having positive slope.

Now the negative feedback provided by the present invention has a certain effect on the mean value of V1 insofar as each time A2 delivers a high voltage level, an additional DC component is superposed on the fraction of D+ taken into account by the divider bridge R1, R2. Regulation is thus performed on a voltage that differs from the voltage D+ in a manner that increases with the ratio between the excitation periods (V3=5 V) and the de-excitation periods (V3=0 V). Consequently, given that the threshold Vref is itself constant, it will be understood that the mean value of the actual regulated voltage D+ decreases with load, and to a first approximation this gives rise to a straight line d2 of negative slope, as represented by a dot-dashed line.

Practical tests have shown that the above two effects compensate well (i.e. the absolute values of the slopes of d1 and d2 are similar), with the result that the mean value of the regulated voltage remains practically constant regardless of the load (solid line d3).

In this way, regulation based on the negative peaks in the ripple component of the filter voltage, in combination with negative feedback, gives rise to a regulated voltage whose mean value varies little as a function of load, and this constitutes an additional advance over the prior art.

Two variant embodiments of the invention are now described with reference to FIGS. 6 and 7. In these variants, the negative feedback resistor R14 is replaced by a current source which is easier to implement when the device of the invention is made in the form of an integrated circuit.

Figure 6:
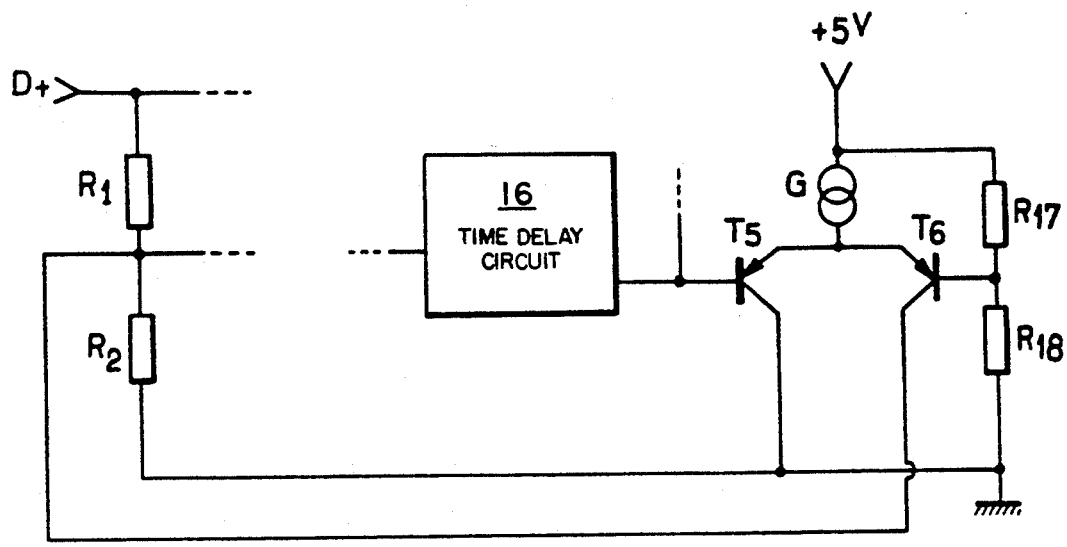
FIG. 6 shows a variant of the device of the present invention.
Figure 7:
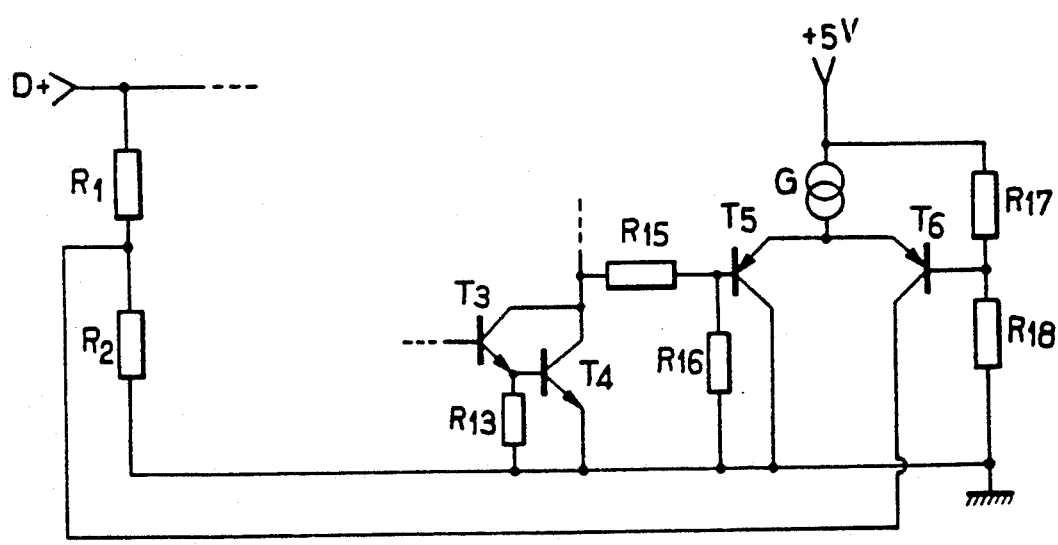
FIG. 7 shows another variant of the device.

In FIGS. 6 and 7, items or components that are identical or similar to those of the preceding figures have been given the same reference numerals and are not described again.

In FIG. 6, the output from the time delay circuit 16 is connected not only to the power circuit (not shown) but also to the base of a PNP transistor T5 whose collector is connected to ground. The emitter of T5 is connected firstly to a current source G which is in turn connected to the +5 V line, and secondly to the emitter of a PNP transistor T6. A bias voltage is applied to the base of T6 via a divider bridge R17, R18 connected between the +5 V line and ground. The collector of T6 is connected to the common point between R1 and R2.

The transistors T5 and T6 act as switches for selectively applying or not applying the current produced by G to this common point, depending on the output state of the time delay circuit 16. Negative feedback is thus obtained which is equivalent to that obtained by the resistor R14 in FIG. 2.

The variant of FIG. 7 differs from that of FIG. 6 essentially by the fact that the base of T5 is no longer controlled directly by the output of the time delay circuit 16, but is controlled by the output (collector) of the power transistor T4 which also controls the current flowing through the excitation winding of the alternator. The collector voltage of T4 is applied to the base of T5 via a divider bridge R15, R16 which is connected between said collector and ground. Operation is equivalent to that of the circuit shown in FIG. 6.

Naturally the present invention is not limited in any way to the embodiments described above, and the person skilled in the art will be able to make variants and changes within the scope of the invention. In particular, the above-described time delay circuit may be replaced by any equivalent circuit, and in particular by a digital counter circuit, comprising in conventional manner counters associated with a clock operating at a suitable rate.

Similarly, the passive filter formed in FIG. 2 by R3 and C1 may be replaced by an active filter.

We claim:

1. A regulator device for charging a battery from an alternator that delivers a rectified voltage including a ripple component, the device being of the type including a regulator circuit acting on the mean value of the rectified alternator voltage and comprising, in succession, a circuit for obtaining the mean value, a threshold comparator, a time delay circuit, and a power stage for controlling the current flowing through an excitation winding of the alternator, the device including a negative feedback circuit between the time delay circuit output and the input side of the circuit for obtaining the mean value, and suitable for shifting said mean value downwards during periods when the excitation current is decreasing.

2. A device according to claim 1, wherein the circuit for obtaining the mean value produces an output voltage including a low amplitude residual ripple component, and wherein the time delay circuit is triggered by negative peaks of said ripple component crossing the threshold of the comparator.

3. A device according to claim 1, wherein a voltage divider is provided at the input side of the circuit for obtaining the mean value.

4. A device according to claim 1, wherein the circuit for obtaining the mean value is constituted by a low pass filter.

5. A device according to claim 1, wherein the time delay circuit comprises a two-threshold comparator having a capacitor disposed at the input side of the comparator with charging and discharging of the capacitor being controlled as a function of the output state of the comparator.

6. A device according to claim 1, wherein the time delay circuit comprises a digital counter circuit.

7. A device according to claim 1, wherein the time delay circuit delivers a rising voltage edge to reduce the excitation current, and wherein the negative feedback circuit is a resistive circuit.

8. A device according to claim 1, wherein the negative feedback circuit comprises a current source and switching means to apply the current from the source to the input of the circuit for obtaining the means value selectively as a function of the output state of the time delay circuit.

9. A device according to claim 8, wherein the negative feedback circuit is connected directly to the output of the time delay circuit.

10. A device according to claim 8, wherein the negative feedback circuit is connected to the output of the power stage.

* * * * *

UNITED STATES PATENT AND TRADEMARK OFFICE
CERTIFICATE OF CORRECTION

PATENT NO. : 5,233,285
DATED : August 3, 1993
INVENTOR(S) : Pierret et al.

It is certified that error appears in the above-identified patent and that said Letters Patent is hereby corrected as shown below:

Title page, item [73]
Assignee

Please delete "Valeo Equipemento Electriques Moteur, Creteil, France" and substitute--Valeo Equipements Moteur, Creteil, France and SGS-Thomson Microelectronics SRL, Brianza, Italy--.

Signed and Sealed this

Fifth Day of April, 1994

Attest:

BRUCE LEHMAN

*Attesting Officer*    *Commissioner of Patents and Trademarks*